United States Patent [19]

Metz et al.

[11] 4,362,415
[45] Dec. 7, 1982

[54] EXTENSIBLE AND RETRACTABLE STRUT WITH SAFETY LATCH

[75] Inventors: Joseph R. Metz, Ridgefield; Richard C. Lutterman, Danbury, both of Conn.

[73] Assignee: Norco, Inc., Ridgefield, Conn.

[21] Appl. No.: 249,687

[22] Filed: Mar. 31, 1981

[51] Int. Cl.³ .............................................. F16B 7/10
[52] U.S. Cl. ................................... 403/109; 403/317; 403/328; 248/285
[58] Field of Search ............... 403/328, 317, 325, 327, 403/104, 105, 106, 109, 110, 166; 248/408, 409, 412, 297.3, 285, 286, 287

[56] References Cited

U.S. PATENT DOCUMENTS

| 1,212,016 | 1/1917 | Cater | 403/106 |
| 2,682,414 | 6/1954 | Richardson | 403/325 |
| 3,678,439 | 7/1972 | Vetter | 403/325 X |
| 4,289,414 | 9/1981 | Recker | 403/328 X |

FOREIGN PATENT DOCUMENTS 1068962 11/1959 Fed. Rep. of Germany ...... 403/317

Primary Examiner—Wayne L. Shedd
Attorney, Agent, or Firm—H. Gibner Lehmann; K. Gibner Lehmann

[57] ABSTRACT

An extensible and retractable strut comprising telescoping pairs of members the outer of which carries a manually operable collar that is slideable between locking and unlocking positions. The collar carries a manually-releasable pivoted locking lever having an offset end that can be received in an opening of the outer member to lock the strut in adjusted position against release when the collar is in its locking position. When the collar is in the unlocking position, the offset portion of the lever is out of registration with the opening and instead bears against the exterior of the outer member. For such circumstance the members are relatively moveable between their extended and retracted positions. A keying means carried by the collar is engageable with cooperable means on the outer member to maintain the collar in a given aligning position. A biasing spring acting on the locking lever urges the offset portion thereof continuously either into engagement with the outer surface of the outer member or else in the opening thereof. When the offset portion of the locking lever is in the opening and the strut is fully extended, the lever acts as a safety device since it extends past the end of the inner member and constitutes an abutment which positively blocks the inner member, preventing accidental collapse of the strut.

11 Claims, 16 Drawing Figures

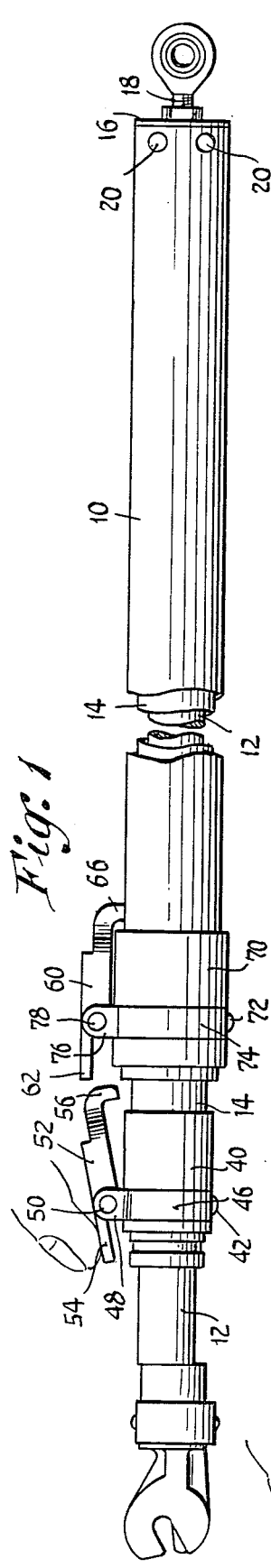
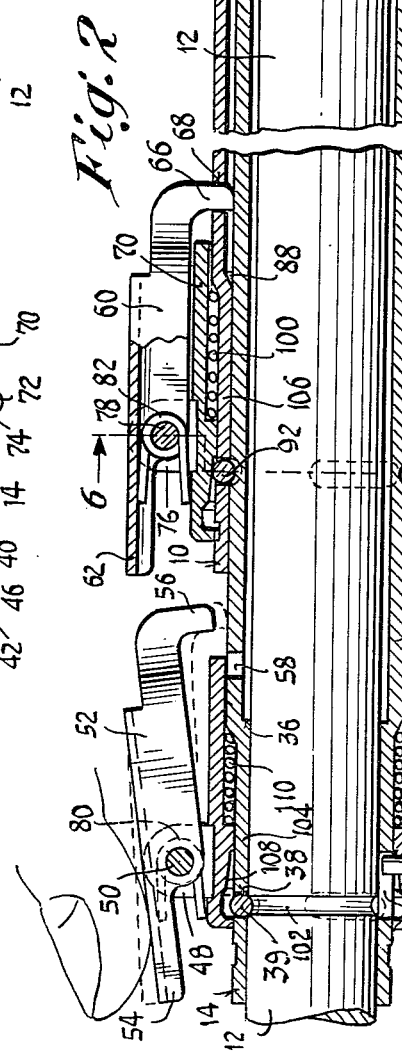
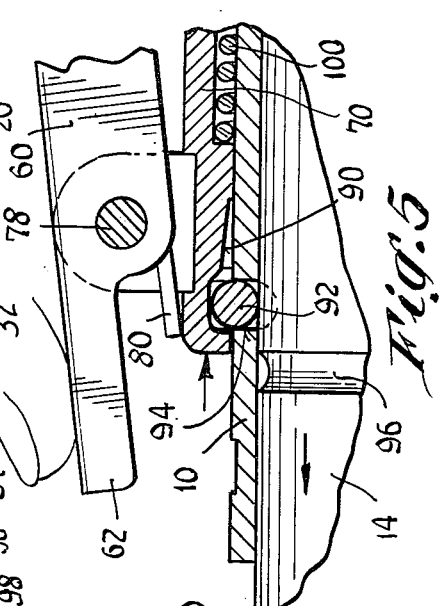
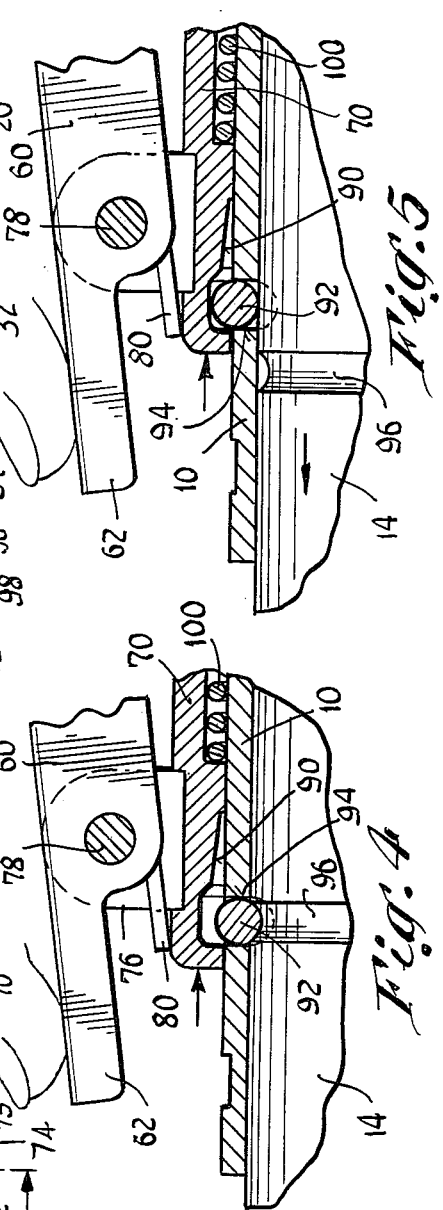
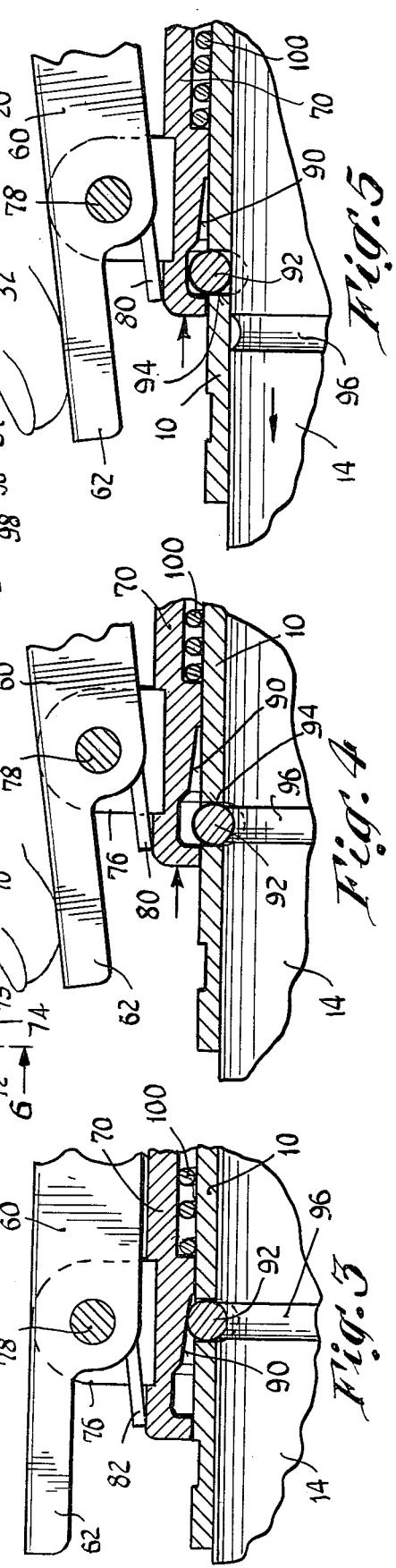

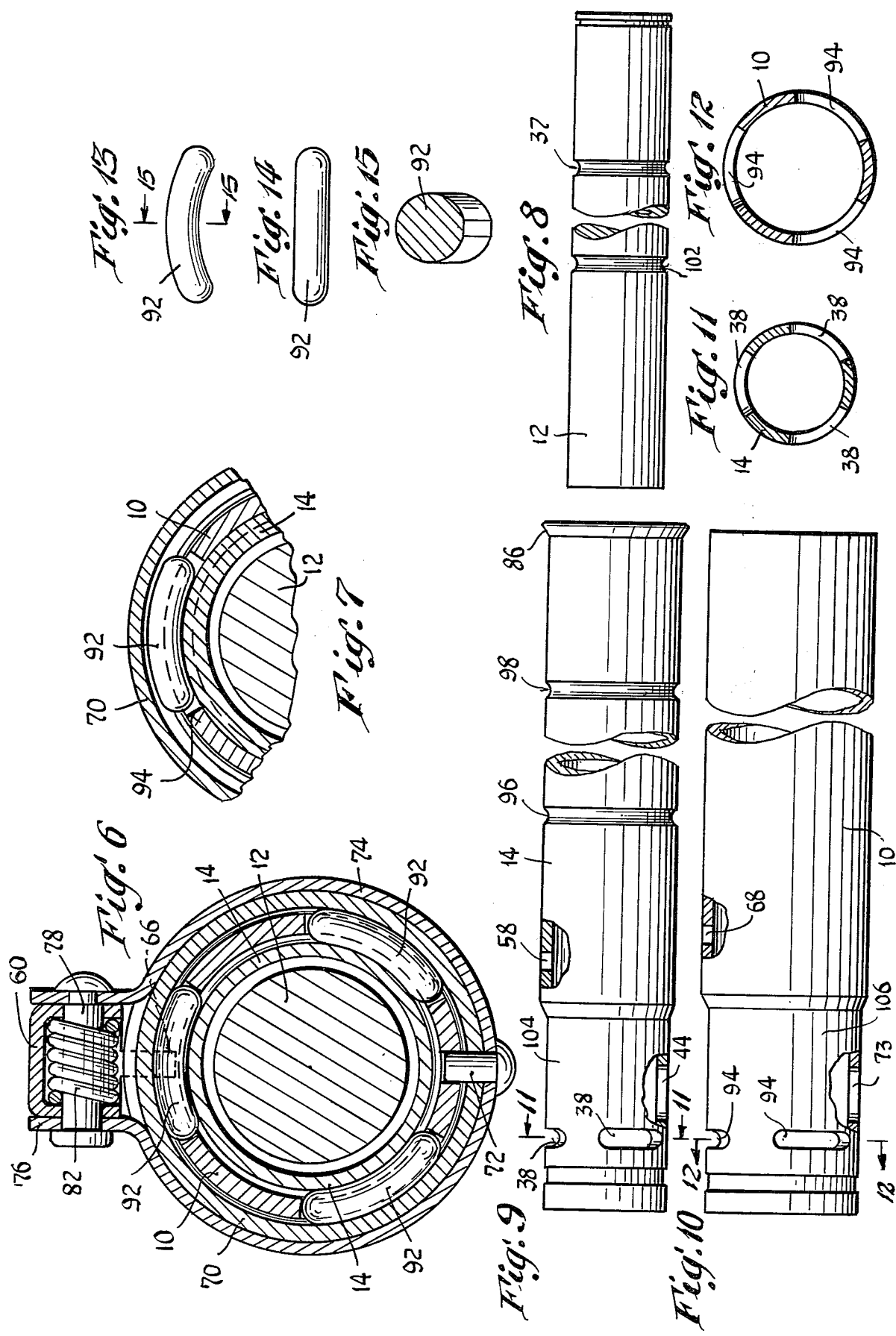

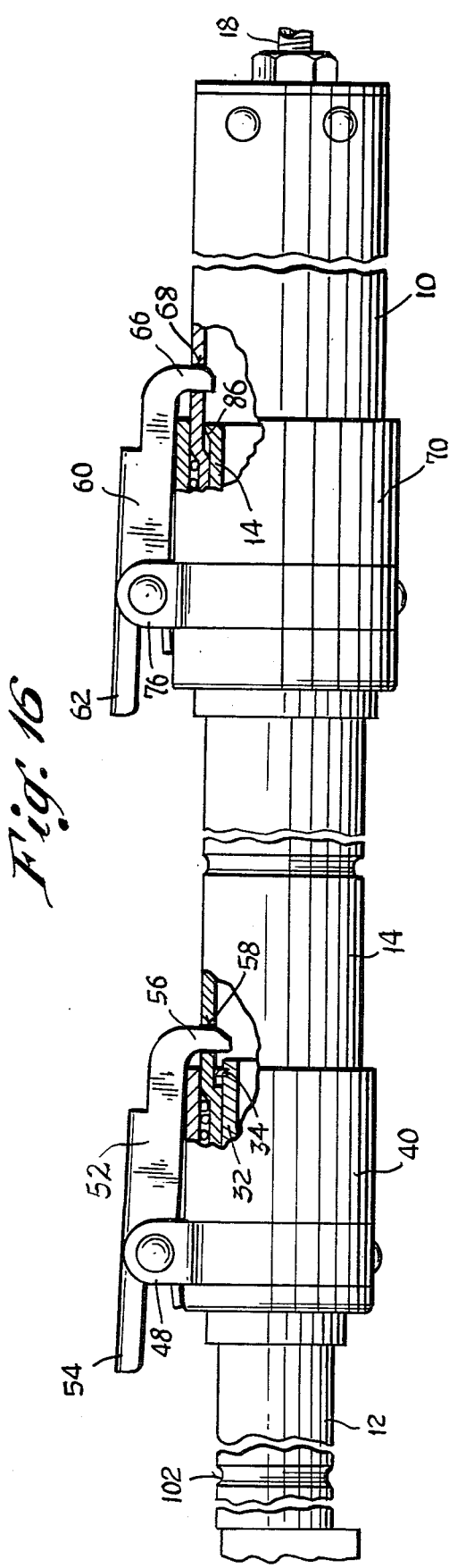

EXTENSIBLE AND RETRACTABLE STRUT WITH SAFETY LATCH

BACKGROUND OF THE INVENTION

This invention relates to extensible and retractable strut constructions, and more particularly to constructions of this type wherein telescoping members constitute the strut elements and are relatively axially movable between extended and retracted positions. The invention concerns improvements in U.S. Pat. No. 3,945,744 issued Mar. 23, 1976 to Joseph R. Metz and having the same assignee as the present invention.

In addition to the disclosure of this U.S. Pat. No. 3,945,744, in the past various types of extensible and retractable struts have been proposed and produced. These have variously employed manually operable, or automatic or semi-automatic locking or clamping devices by which the strut members were secured in various adjusted positions, and released from such positions, usually in response to manual activation of the clamping or locking device.

In some prior constructions the clamping operation required the tightening of a clamp screw, which was somewhat time consuming and not automatic. Other types of struts had locking or clamping devices of an automatic nature, but these were mostly uni-functional in their action, and operated in a particular manner which was predetermined by their construction and specific action. No option was had by the operator, as to whether or not the locking device could operate as the strut member attained the desired extended or retracted positions.

Additionally, many of the prior devices were not especially reliable, or else complicated in their manufacture in order to obtain the desired type of operation. This resulted in increased costs, particularly where special operations were needed to produce the various components. Sometimes the struts were accidentally or unintentionally released, causing inconvenience or damage, or both.

SUMMARY

The above drawbacks and disadvantages of prior extensible and retractable strut devices are obviated by the present invention, which has for one object the provision of a novel and improved automatically-locking, safety strut employing telsecoping tubular members, wherein the locking device is especially reliable and proof against inadvertent release, thereby insuring the proper functioning of the strut, and preventing its accidental collapse.

Another object of the invention is to provide an improved extensible and retractable strut construction as above set forth, wherein relatively simple components and assemblies are involved, enabling the finished article to be produced at a minimum cost.

Still another object of the invention is to provide an improved extensible and retractable strut in accordance with the foregoing, which is especially sturdy and resistant to malfunctioning and/or breakage, and yet which can be easily and quickly released or actuated.

A still further object of the invention is to provide an improved extensible and retractable strut as above characterized, which is resistant to vibration and rattling, particularly in its closed or retracted condition.

In accomplishing the above objects the invention provides a strut construction characterized by inner and outer tubular telescoping strut members which are relatively shiftable between extended and retracted positions. The outer strut member carries a maually operable collar which is slideable within limits from an unlocking to a locking position and vice versa. Cooperable means on the collar and outer tube restrict the sliding movement of the collar to said positions, and also prevent relative turning movement. A safety locking and release lever is pivotally mounted on the collar and has a laterally offset tip portion which is receivable in a locking opening of the outer tube when the collar is in its locked position.

Cooperable means are provided, to effect the locking of the tubes in extended position or retracted position in response to the action of the slideable collar. In conjunction with such means a biasing spring is provided on the outer tube, which normally biases the collar to its locking position. The inner member has annular grooves in its exterior surface, which are adapted to receive curved segmental locking dogs which are carried in circumferential slots of the outer tube and which are acted on by an internal conical cam surface of the collar. When the collar is under the influence of its biasing spring, the internal cam surface forces the locking segments into an annular groove of the inner tube as such groove comes into registration, thereby to lock the tubes in an adjusted relative axial position. Locking-dog devices of this type are illustrated and described in the above identified U.S. Pat. No. 3,945,744.

The safety locking lever on the collar is acted on by a biasing spring, which maintains the offset tip thereof either in engagement with the exterior surface of the outer tube or else disposed in the restrainer opening of the same. This lever insures against inadvertent release or collapse of the strut, by extending past the end of the inner tube when the strut is in extended position.

The entire telescopic strut can be constituted of a plurality of sets of pairs of telescoping tubes, wherein each adjacent pair functions cooperatively, and also the tube of each pair can function independently of the other tube and in cooperation with a third telescoping tube.

Other features and advantages will hereinafter appear.

In the accompanying drawings

FIG. 1 is a side elevational view of the improved strut construction of the present invention, with portions of the tubes being broken away and illustrating one safety latch as being manually released, for unlocking part of the strut.

FIG. 2 is a fragmentary axial sectional view of the strut of FIG. 1, with end portions not shown.

FIG. 3 is an enlarged fragmentary axial sectional view of the locked portion of the strut of FIGS. 1 and 2, revealing details more clearly.

FIG. 4 is a view like that of FIG. 3, but with the locking released.

FIG. 5 is a view like that of FIG. 4, but showing the intermediate tube as having been relatively axially shifted.

FIG. 6 is a transverse sectional view enlarged, taken on the line 6—6 of FIG. 2 and showing the locking condition of the strut.

FIG. 7 is a fragmentary view of the section of FIG. 6, but showing the unlocked condition of the strut.

FIG. 8 is a side elevational view of the innermost one of the telescoping tubes of the strut, with portions broken away for convenience of illustration.

FIG. 9 is a side elevational view of the intermediate strut or tube member, with portions broken away.

FIG. 10 is a side elevational view of the outermost tube member, with portions broken away.

FIG. 11 is a transverse section taken on the line 11—11 of FIG. 9.

FIG. 12 is a transverse section taken on the line 12—12 of FIG. 9.

FIG. 13 is a front elevational view of one of the locking dog segments.

FIG. 14 is a top elevational view of the locking dog segment.

FIG. 15 is a transverse section taken on the line 15—15 of FIG. 13, and

FIG. 16 is a fragmentary side elevational view of the strut with the members in extended position, illustrating the safety locking action of the release levers by which accidental collapse of the strut is prevented.

Referring first to FIG. 1 the improved strut construction as shown therein comprises three telescoping members, an outermost tube 10, an innermost tube or member 12, and an intermediary tube 14. The outermost tube 10 has affixed in one end an end fitting or plug 16 having a threaded central bore (not shown) by which it can be secured to the threaded stud 18 of associated equipment (also not shown). The fitting 16 is secured in place by four drive pins 20 as shown in FIG. 2, and has a central inward extension or stud 22 including an end portion 24 of reduced diameter, the latter forming an abutment shoulder 26 with the stud portion 22.

Carried on the reduced-diameter portion 24 is a helical coil spring 28 one end of which engages the shoulder 26 and is backed up thereby. The other end of the compression spring 28 engages an internal shoulder 30 of the inner member or tube 12 which latter has its end portion 32 formed with an enlarged bore to accommodate the spring 28 and stud 22. With the parts in the positions illustrated in FIGS. 1 and 2, wherein the collapsible strut is in its retracted position, the coil spring 28 is compressed and continually urges the innermost member 12 to the left. The continuing force exerted by the spring prevents looseness and rattle, and makes for a tight assemblage for the retracted condition of the strut.

The innermost end of the innermost member or tube 12 (which can be of solid stock that is bored at its ends, as shown, or else of tubular stock) carries a square-section snap ring 34 in an annular groove, such ring being slideable in the intermediate tube 14 and constituting a bearing during extending movement of the innermost tube 12 from right to left as viewed in FIG. 1.

The inner tube 12 can extend to the left until the snap ring 34 engages an internal shoulder 36 of the intermediate tube 14, at which time an annular groove 37 of the tube 12 will register with a plurality of apertures 38, see FIGS. 2 and 9, of the intermediate tube 14 for lock-up by means of dogs 39 as will be explained below.

Carried by the intermediate tube 14 is a collar 40 which is restrained to limited axial movement between locking and unlocking positions by means of a keying drive pin 42 which passes through the bottom side wall of the collar and extends into an axially extending slot 44 in the intermediate tube 14.

In accordance with the invention, a novel safety means to maintain lock-up, is provided. In effecting this, the collar 40 carries a circular strap 46 which is held under the drive pin 42 and which encircles the collar, having a pair of upstanding, spaced-apart apertured ears 48 through which there extends a pivot pin 50 that constitutes a fulcrum for a safety locking lever 52. The lever 52 is in the nature of a first-class lever, having a finger-engageable portion 54 adapted to be depressed by manual pressure; it has a laterally-offset bill portion 56 which can enter an opening 58 in the intermediate tube 14, in a manner similar to the lever 60 illustrated in FIG. 2. Such disposition of the bill 56 in the opening 58 occurs when the collar 40 is shifted from its unlocked full line positions in FIGS. 1 and 2 to a position like that of the lever 60. Considering this latter, by depressing the finger portion 62 of the lever 60, the bill portion 66 thereof can be raised out of the opening 68, enabling the collar 70 to be shifted to the right (see FIG. 4) whereby it will occupy a position like that shown for the lever 52, and the bill portion 66 of the lever 60 will be resting on the exterior surface of the outermost tube 10, similar to that indicated by the broken lines for the lever 52. For this condition, the intermediate tube 14 is released, and can shift leftward, as indicated in FIG. 5.

The collar 70 has a movement-restricting drive pin 72 extending into a slot 73 of the outer tube 10 and holding captive a bearing strap 74 having apertured ears 76 receiving a pivot pin 78 which passes through the locking, safety lever 60.

Helical torsion springs 80 and 82 are carried respectively by the pivot pins 50 and 78, and have ends engaging the collars 40 and 70, and also the locking levers 52 and 60 in order to continuously bias the levers in a clockwise direction as viewed in the figures.

The intermediate tube 14 has an outwardly-directed annular flange 86 at its inner end, engageable with an internal shoulder 88 of the outer tube 10 to limit the relative extending movements of these two tubes. To extend or retract the strut, finger pressure is applied to the portion 54 of the lever 52, or the portion 62 of the lever 60. If the latter, the collar 70 can be shifted to the right against the action of the coil spring 100.

It will be noted that when the collar 70 is in its unlocked position shifted to the right from that shown, the camming surface 90 will provide clearance space for the locking dogs 92 which are carried in the circumferential slots 94 of the tube 10, whereby the dogs can shift radially outward and out of the groove 96 of the intermediate tube 14. Thus, the intermediate tube 14 can then be pulled to the left, almost fully out of the outer tube 10. At the end of the leftward, extending movement of the intermediate tube 14 the flange 86 thereof will engage the shoulder 88 of the outer tube 10, and the groove 98 of the tube 14 will register with the slots 94 of the tube 10. The spring 100 in the collar 70 can then advance the collar and its cam surface 90 against the dogs 92, forcing these latter into the groove 98 and locking the intermediate tube 14 in its extended position in the outer tube 10.

It will thus be seen that an automatic locking of the intermediate tube 14 occurs upon its attaining the fully extended position. This same is true with respect to the intermediate tube 14 and the innermost tube 12 as the bill portion 56 of the locking safety lever 52 enters the opening 58 in the intermediate tube 14 and comes to rest.

As seen in FIG. 8, the innermost tube 12 has a second annular groove 102 in its exterior, in addition to the groove 37. It will be understood that this innermost tube 12, and also the intermediate tube 14 can have more than the two grooves shown. With two grooves, the tubes as shown have either fully extended or else fully retracted positions, the latter being illustrated in FIGS. 1 and 2.

The intermediate tube 14 as shown in FIG. 9 has an end portion 104 of reduced diameter, which provides the interior shoulder 36 (see FIG. 2). Also, the outer tube 10 as shown in FIG. 10 has a portion 106 of reduced diameter, which provides the internal shoulder 88 (see FIG. 2).

A brief description of the operation of the safety-latch strut is as follows: The strut construction is shown in the fully-retracted position in FIGS. 1 & 2, and normally the safety latching lever 52 is not as seen but instead in its locking position, (which is similar to the locking position shown for the lever 60) with the bill 56 of the lever 52 disposed in the opening 58 of the intermediate tube 14. The camming surface 108 of the collar 40 has shifted all of the locking dogs 39 into the groove 102 of the inner tube 12, and all of the tubes are thus locked in their retracted positions, being under the action of the spring 100 for the collar 70 and of a similar spring 100 in the collar 40.

To extend the strut, the user applies finger pressure to the portion 54 of the lever 52 to disengage the bill 56 from the opening 58, and thereafter the user shifts the collar 40 to the right against the action of the coil spring 110. This releases the dogs 39, and now the innermost tube 12 can be pulled to its extended position wherein the split ring 34 engages the shoulder 36 and brings the groove 37 of the tube in registration with the retracted dogs 39. Upon the user releasing the collar 40 it will snap to its locking position, forcing the dogs 39 radially inward into the groove 37, and spring 80 will force the safety lever 52 clockwise to again cause engagement of the bill 56 in the opening 58.

In a like manner, the safety lever 60 is actuated, with the collar 70, to release the intermediate tube 14 from the locking dogs 92 whereupon the intermediate tube can be pulled outward to effect engagement of its flange 86 with the shoulder 88, bringing the groove 98 of the intermediate tube in registration with the retracted locking dogs 92. Release of pressure from the safety latch 60 and collar 70 will now enable the spring 100 to return the collar to its locking position wherein the camming surface 90 forces the dogs 92 radially inward, into the groove 98. The entire strut is now securely locked in extended position, and as provided by the invention, the safety latches 52 and 60 will prevent inadvertent shifting of the collars 40 and 70 respectively in any manner, to release the strut. Only when proper pressure is applied to release the latches 52, 60 can the collars 42, 70 be shifted to effect release of the strut sections.

An important feature of the invention resides in the safety construction involving the levers 52 and 60, this being illustrated particularly in FIG. 16. When the strut is fully extended, the levers 52 and 60 will occupy the positions shown, wherein the bill portions 56 and 66 extend through the openings 58 and 68 respectively. It will be seen that these bill portions also extend transversely past the inner ends of the respective tubes 32 and 14, thus constituting blocking abutments and acting thereby to positively prevent any accidental collapse of the strut. A doubly safe retention of the strut in its extended position is thus had.

It will now be seen that I have provided by means of the safety latches 52, 60 an extremely reliable strut construction, which will remain in either its given extended or else its given retracted position against accidental shifting. Relatively simple parts are involved, and the various components and movements are straightforward and relatively trouble-free.

Variations and modifications are possible without departing from the spirit of the invention.

What we claim is:

1. An extensible and retractable strut comprising in combination:
    (a) a pair of telescoping members relatively shiftable between a retracted position wherein the members are nested one in the other, and an extended position wherein the members are only partially nested one in the other,
    (b) a manually-operable collar slideable on the outer member adjacent one end thereof,
    (c) cooperable means on said collar and outer member, restricting axial sliding movement of the collar between locking and unlocking positions,
    (d) biasing means engageable with the outer member and collar, urging the latter toward its locking position,
    (e) releasable means for locking said members to each other when the collar is in its locking position, and
    (f) a manually-releasable safety locking means operative in response to the collar being shifted by said biasing means to its locking position, for locking the collar is said position.
2. The invention as defined in claim 1, wherein:
    (a) said safety locking means comprises a locking and release lever and means pivotally mounting the same on the collar, and
    (b) means on said outer member, cooperable with said locking and release lever.
3. The invention as defined in claim 2, wherein:
    (a) said locking and release lever has a retainer tip portion,
    (b) said outer member means being adapted to cooperate with the retainer tip portion of the locking lever, to control the movement of the collar.
4. The invention as defined in claim 3, wherein:
    (a) said retainer tip portion of the locking and release lever normally engages an exterior surface of the outer member when the collar is in its unlocking position.
5. The invention as defined in claim 3, wherein:
    (a) said retainer tip portion of the locking and release lever is laterally offset from the lever, and
    (b) the means of the outer member which cooperates with the retainer tip portion comprises a shoulder of an aperture in the member,
    (c) said laterally offset tip portion of the lever being receivable in said aperture.
6. The invention as defined in claim 2, wherein:
    (a) the means for pivotally mounting the locking and release lever comprises a strap encircling the collar and having spaced-apart, apertured ears, and
    (b) a pivot pin extending through said ears and through the said lever.
7. The invention as defined in claim 6, and further including:
    (a) a torsion spring encircling the pivot pin, having ends, engaged respectively with the collar and locking and release lever.
8. The invention as defined in claim 2, wherein:

(a) said locking and release lever comprises a first-class lever,
(b) one end portion of the lever constituting a finger piece adapted to receive pressure to shift said retainer tip portion away from the outer member.

9. The invention as defined in claim 1, wherein:
(a) said safety locking means comprises a lever having an offset retainer tip portion,
(b) said outer member having an opening in its wall to receive said retainer tip portion,
(c) the inner end of the inner member shifting past said opening when the members are relatively moved to extended position,
(d) said retainer tip portion of the lever when in said opening of the outer member constituting a blocking abutment that is engageable with said inner end, thereby to prevent accidental collapse of the strut.

10. The invention as defined in claim 9, wherein:
(a) said lever is carried by the said collar.

11. The invention as defined in claim 9, and further including:
(a) means biasing said lever to effect a yielding retention of the tip portion thereof in said opening.

* * * * *